United States Patent [19]

Woster et al.

[11] Patent Number: 4,975,199

[45] Date of Patent: Dec. 4, 1990

[54] WATER RECLAMATION PROCESS

[75] Inventors: Stanley Woster, Rendondo Beach, Calif.; John W. DeVore, S. Berwick, Me.; Thomas J. Yurko, Tonopah, Ariz.

[73] Assignee: Advasnced Water Technology, South Berwick, Me.

[21] Appl. No.: 427,766

[22] Filed: Oct. 27, 1989

[51] Int. Cl.⁵ ............................................. B01D 61/02
[52] U.S. Cl. .................................... 210/638; 210/663; 210/669
[58] Field of Search ............... 210/634, 638, 641, 644, 210/649–654, 660, 663, 669, 294, 257.2, 321.6, 321.72

[56] References Cited

U.S. PATENT DOCUMENTS 4,169,789  10/1979  Lerat ................................. 210/257.2
4,761,295   8/1988  Casey ................................ 210/257.2

Primary Examiner—Frank Sever
Attorney, Agent, or Firm—Knobbe, Martens, Olson & Bear

[57] ABSTRACT

The invention relates to a process of reclaiming deionized water from waste water contaminated with particulate materials, detergents, biological and/or radioactive materials, comprising the steps of:

a. passing the waste water through one or more particulate filters to remove the particulate materials;

b. directing the effluent from the particulate filter(s) through a first reverse osmosis filter to generate purified water essentially free of detergents, biological and radioactive contaminants and bypass water contaminated with the impurities removed from the effluent; and c. removing ions from the purified-free water to generate deionized water.

16 Claims, 3 Drawing Sheets

WATER RECLAMATION PROCESS

FIELD OF INVENTION

This invention relates to the process of reclaiming deionized water from radioactively and biologically contaminated water. More particularly, the invention concerns a water reclamation process especially suitable for the purification of wash water of laundries that wash protecting clothing contaminated with radioactive materials.

BACKGROUND ART

In the nuclear power plant industry, the continuous monitoring, repair, and maintenance of the plant by personnel results in thousands of sets of soiled Protective Clothing (PCs) per day. These PCs are biologically soiled and radioactively contaminated. This high volume of contaminated clothing requires round-the-clock laundering service.

There are presently two laundering options: (1) Dry cleaning, and (2) Water Wash.

Dry Cleaning Method:

There are several distinct disadvantages to using the dry cleaning method.

1. The dry cleaning method used to be popular because it produced small amounts of radioactive waste material to be disposed of. However, early in 1989 the U.S. Environmental Protection Agency classified dry cleaning fluids as hazardous chemicals. Any hazardous chemical that contains radioactivity is classified as "mixed waste". Mixed wastes are not accepted at Radiation Waste Disposal Sites. Therefore, radioactive dry cleaning wastes must be stored forever at the facility where they are generated.

2. Dry cleaning fluids are less efficient in the presence of moisture in removing soils, odors, and radioactive contamination. PCs have a lot of perspiration in them from very warm work areas, and multiple layers of clothing. The perspiration does not evaporate because the PCs are sealed in plastic bags immediately upon removal.

3. The workers who wear the PCs complain of the offensive odor. The same dry cleaning fluid is used over and over again for several loads before being distilled and recycled. Many facilities that use dry cleaning also routinely use water wash just to remove the unpleasant odor.

4. Dry cleaning also may cause damage to elastic and other synthetic parts of the protective clothing.

5. Repeated use of dry cleaning of PCs may cause skin irritations in the workers who wear them.

6. The evaporation of dry cleaning fluids into the atmosphere has been determined to be harmful to the ozone layer. Considerable amounts of dry cleaning fluids evaporate in the routine dry cleaning process.

Water Wash Method Without Reclamation:

1. One method has been to use fresh water for each laundry load (approximately 80 to 140 gallons). This produces tens of thousands of gallons of waste effluent per day. This contaminated waste effluent must be disposed of. Disposing of such huge quantities of waste water is extremely costly.

2. A second method is to use the same wash water for a number of loads before disposing of it. Some filtering done between loads removes only a little of the radioactive contamination, some of the macro particles, and none of the bacteria or soap. This method is an attempt to reduce the huge quantities of waste requiring disposal. However, this method compromises the quality of the cleaning of the PCs both biologically and radiologically. This method still results in thousands of gallons per day of waste effluent.

3. An option for disposing of waste effluent is steam evaporation. This method reduces the volume of water to a small amount of sludge. However, this method is prohibitively expensive because of equipment cost and the high cost of energy.

4. Many facilities simply dilute the contaminated waste water to maximum allowable concentrations, and dump it in nearby oceans, lakes or rivers. While this is acceptable under contemporary regulations, it does nothing to reduce the total amount of radioactive waste released into the environment.

The objects and advantages of the present invention are:

1. to provide a quantum significant reduction in the volume of radioactive waste requiring disposal;

2. to provide a modular system, so that it can be either portable and easily relocatable, or housed in a permanent structure;

3. to provide a low-cost alternative to other laundry methods which will give the customer added savings in the form of:

a. a reduction of turn-around time for fresh uniforms, thereby avoiding the delays experienced by shipping to a remote processing operation;

b. a reduction in stockpiles of uniforms in excess of daily inventory usage requirements because of the shorter turn-around time;

c. improved control over the inventory minimizing much of the loss and replacement cost of uniforms;

d. waste residues which do not contain hazardous chemicals and are accepted at the radioactive waste disposal sites.

4. to provide laundry facilities with the ability to give higher quality of cleaning by using fresh wash water for each load, which will result in a. fresher smelling clothing;

b. no damage to elastics and other synthetic materials in the clothing;

c. fewer skin irritations;

5. to provide laundry facilities with the ability to be water efficient, to thereby save one of our world's diminishing resources.

While the present invention is described primarily in the context of treatment of laundry materials contaminated with radioactive materials, it should be recognized that it is also useful in generating ion-free water for use in hospital laundries, in processing of semiconductor materials, and in manufacture and processing of medical materials.

SUMMARY OF INVENTION

Figure 1:
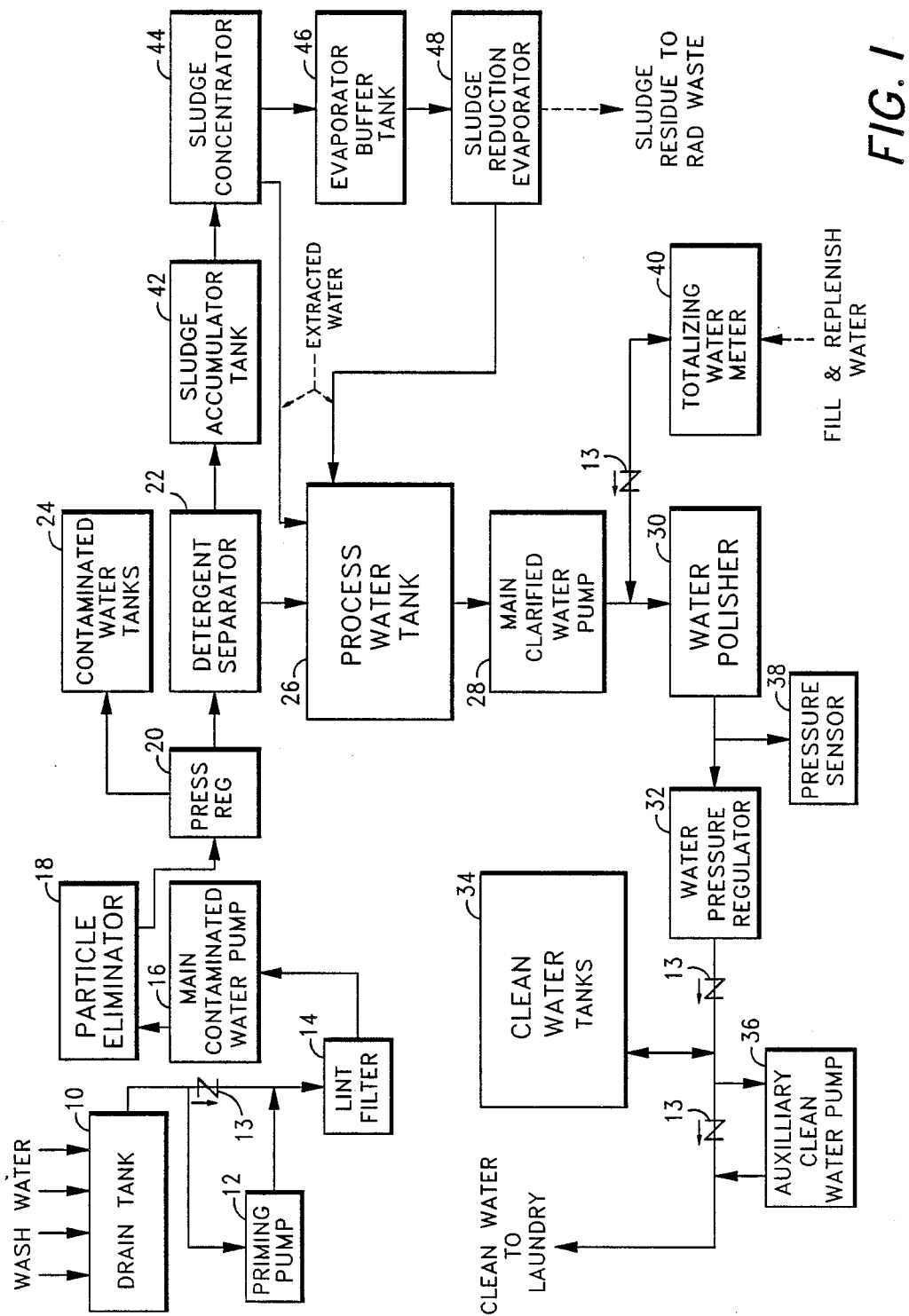
FIG. 1 shows a Flow Chart of each stage of the Water Reclamation Process.

The present invention relates to a process for reclaiming deionized water from waste water contaminated with particulate materials, detergents, biological and/or radioactive materials, comprising the steps of:

a. passing the waste water through one or more particulate filters to remove the particulate materials;
b. directing the effluent from the particulate filter(s) through a first reverse osmosis filter to generate purified water essentially free of detergents, biological and radioactive contaminants and bypass water contaminated with the impurities removed from the effluent; and
c. removing ions from the purified-free water to generate deionized water.

One application of the process is in laundry for water sparse areas where water supplies are not meeting the population influx.

Accordingly, the invention also relates to a process for reclaiming water used in a laundry that washes protective clothing contaminated with radioactive materials, comprising the steps of:
a. washing the protective clothing in a wash solution containing detergent and deionized water to generate an effluent;
b. passing the effluent water through one or more particulate filters to remove particulate materials;
c. directing the effluent from the particulate filter(s) through a first reverse osmosis filter to generate purified water essentially free of detergents, biological and radioactive contaminants and bypass water contaminated with the impurities removed from the effluent; and
d. removing ions from the purified-free water to generate deionized water.

The ion-free water can then be redirected into the same laundry, or used for other purposes.

It is estimated that the Process will purify and recover more than 95% of the waste water. The purified water will be stored in clean water storage tanks for reuse in the laundry system. This reclamation and purification of the waste water results in the reduction of the number of gallons of contaminated waste to less than 5 gallons of waste per day. This reclamation will result in requiring only periodic disposal of a very small volume of concentrated radioactive waste residues, and some filter cartridges.

The Water Reclamation Process does not require a large continuous supply of nuclear grade deionized water from the Site. Water reclamation Process will only require about 5% of the water used in the washers because the System will reclaim approximately 95% of the water used.

The Water Reclamation Process does not generate a large amount of contaminated waste water needing disposal. Water Reclamation Process may only produce, in a whole typical period, less than a couple of hundred gallons of sludge or waste residues for the facility to dispose of, along with the filters and cartridges used in the reclamation process.

Most of the water is reclaimed, and is purified to the quality of distilled water for reuse in the water wash process. The several stages of filtration and purification eliminate all possible traces of radioactive particles. The resulting water is of very high quality. The purified water is naturally soft, and when combined with very little added detergent, results in near perfect wash performance.

The Process so completely extracts most of the water for reuse, that there is very little waste residue left to be disposed of. Cost and performance analysis of existing cleaning systems compared to projections for laundry processed with the Water Reclamation Process (present invention) indicates tremendous savings using the extracted water in the laundry process.

Further application of the generated deionized water may be in semiconductor industry, in hospital laundries or medical instrument sterilization (after no irradiation), in pathology, analytical and forensic laboratories, in purification of laser crystals, etc.

DETAILED DESCRIPTION OF THE INVENTION

A Flow Chart of the Water Reclamation Process of the present invention is illustrated in FIG. 1.

1. Connections: All connections between each described Stage is through Flexible Hose 60 interfacing with silver brazed hard copper piping, unless otherwise stated. The flexible hose used in this process is made of armored high pressure line, like that used in aircraft systems. This hose is used for both input and output of each Stage. Output for one Stage becomes input for the next Stage.

2. Stage 1: Drain Tank 10. Drain Tank 10 is typically constructed out of fiberglass material Input to Tank 10 is connected to the wash water effluent output. Tank 10 typically holds over 300 gallons of water. Tank 10 is vented to the atmosphere through a 3 foot elevated line capped by a High Efficiency Particle (HEPA) Filter Tank 10 contains flotation level sensors to prevent overflow, and low-level flotation sensor to control downstream Main Contaminated Water Pump 16. The output of Tank 10 connects to Priming Pump 12 and Lint Filter 14.

Figure 2:
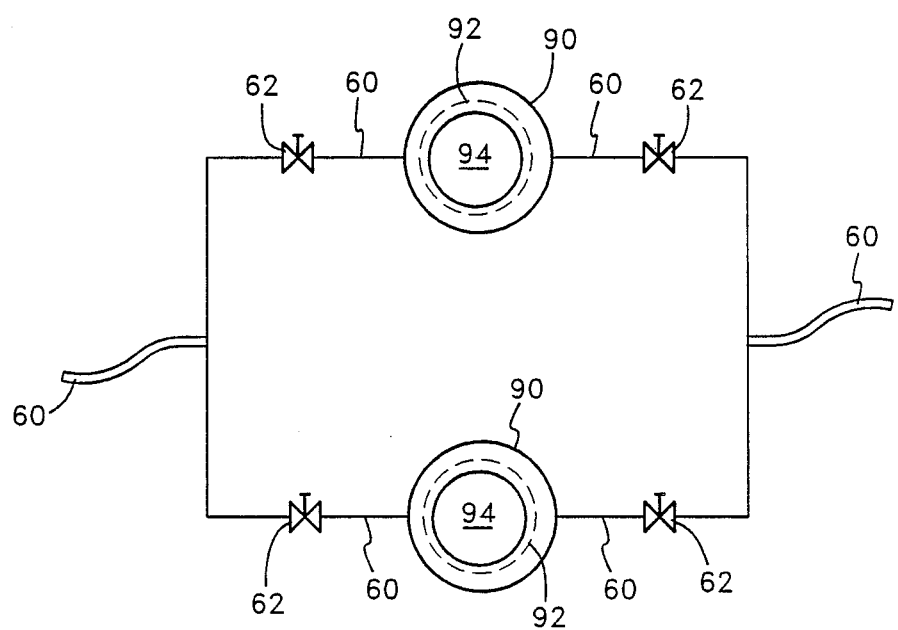
FIG. 2 shows the detail of Particle Eliminator 18.

3. Stage 2: Priming Pump 12 and Check Valve 13. Priming Pump 12 and Lint Filter 14 receive input from Drain Tank 10 through Check Valve 13 Priming pump 12 is manually actuated and low volume. The output of Priming Pump 12 connects to the input of Lint Filter 14. Priming Pump 12 and Check Valve 13 fill up Lint Filter 14 after a filter change 4. Stage 3: Lint Filter 14. Please refer to FIG. 2 for detail of Lint Filter 14. Lint Filter 14 receives input from Drain Tank 10 output and Priming Pump 12 output. Lint Filter 14 is comprised of two independent filter assemblies, installed in parallel. There are separate input and output shutoff valves for each filter.

Each filter assembly consists of Lint Filter Canister 90, Lint Filter Basket 92, and Lint Filter Bags 94. Lint Filter Bags 94 are low cost and disposable. Each Filter Bag 94 has surface area of approximately 235 sq. inches, and mesh size of 0.015 in. The output of Lint Filter 14 connects to the input of Main Contaminated Water Pump 16.

5. Stage 4: Main Contaminated Water Pump 16. Output from Lint Filter 14 connects to the input to Main Contaminated Water Pump 16. Pump 16 is a magnetically driven sealed corrosion- resistant unit. Pump 16 has a maximum head pressure of greater than 70 psi and a maximum pumping volume of greater than 100 gallons per minute. Pump 16 pumps contaminated water through Particle Eliminator 18.

Figure 3:
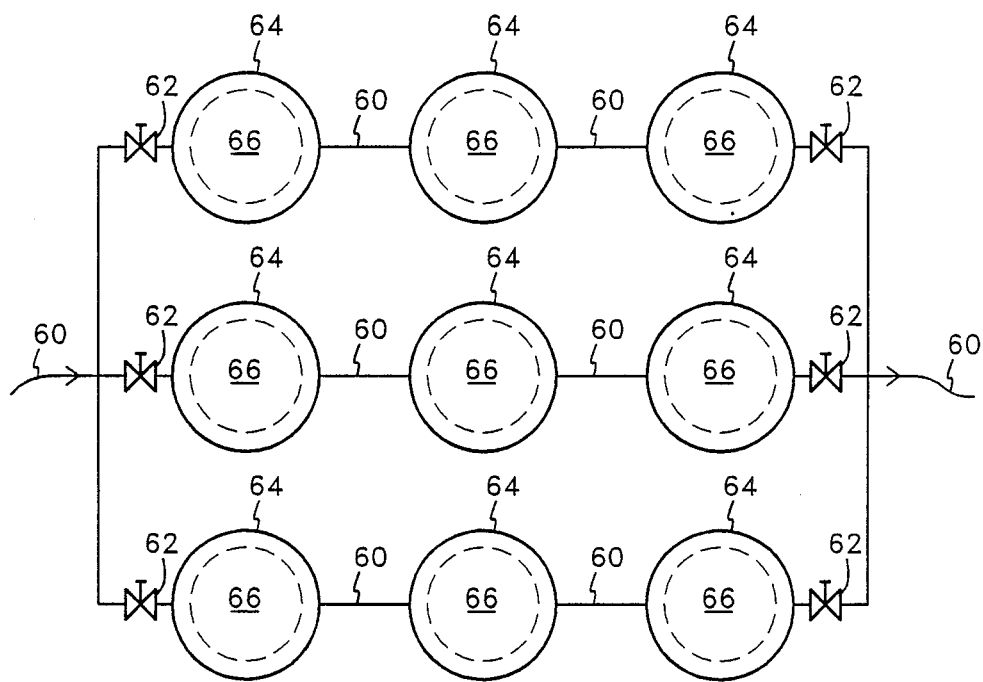
FIG. 3 shows the detail of Water Polisher 30.

6. Stage 5: Particle Eliminator 18. Please refer to FIG. 3 for detail of Particle Eliminator 18. Particle Eliminator 18 receives contaminated water from the Main Contaminated Water Pump 16. Particle Eliminator 18 has three parallel independent filtration assemblies that filter out solid contaminants down to 5 microns in size.

Each filtration assembly consists of three Particle Eliminator Filter Canisters 64 connected in series containing coarse, medium and fine Particle Eliminator Filter Cartridges 66. Each Canister 64 holds two disposable Cartridges 66. Each path has separate input and output shutoff Manual Ball Valves 62.

Cartridges 66 are typically graduated in particle filter size. The first phase is "Coarse", which typically filters out particles greater than 25 microns. The second phase is "Medium", which typically filters out particles greater than 10 microns. The last phase is "Fine", which typically filters out particles down to 5 microns. Cartridge 66 sizes may need to be varied to optimize the filtering for different facilities.

Output from Particle Eliminator 18 connects to Pressure Regulator 20.

7. Stage 6: Pressure Regulator 20. Pressure Regulator 20 is installed downstream from Particle Eliminator 18 in the branched output to Contaminated Water Tanks 24. Pressure Regulator 20 limits the maximum pressure to Contaminated Water Tanks 24 to 50 psi.

8. Stage 7: Detergent Separator 22. Output from Particle Eliminator 18 flows into Detergent Separator 22. Detergent Separator 22 is a custom purchased assembly containing a semi- permeable membrane (reverse osmosis), pumps, monitors, safety shutoffs, water quality indicators, and manual trouble shooting controls. It separates detergent elements, biological soils, most bacteria, and most residual contaminant particles down to sub-micron size. A 250 psi water pump feeds the multiple, ganged, filter assembly. This unit may be operated in a semiautomatic mode. In this mode the turn-on is controlled by input water pressure, and the turn-off is controlled by threshold flotation level sensors located in Sludge Accumulator Tank 42.

The extracted water is now clarified, containing no soap products or biological soils. This extracted water flows to Process Water Tank 26.

The contaminated bypass fluid (a small percentage of the total flow, typically 5%) contains detergent, biological soils, and some radioactive particles in the sub-micron range. This low-pressure low-volume residual flows to Sludge Accumulator Tank 42 for further concentration and water reclamation.

9. Stage 8: Contaminated Water Tanks 24. These two bladder-type tanks typically hold a total of 700 gallons. Tank 24 serves as a buffer storage for feed into Detergent Separator 22. These tanks also smooth out the pressure peaks from Main Contaminated Water Pump 16.

10. Stage 9: Process Water Tank 26. Typically this tank holds 375 gallons. It is atmospherically-vented with an elevated HEPA filter. Process Water Tank 26 collects extracted water from Detergent Separator 22, Sludge Concentrator 44, and Sludge Reduction Evaporator 48. The extracted water comes into Process Water Tank 26 at very low pressure (0+ psi). Process Water Tank 26 has three flotation sensors which:
a. shut down the up-stream water sources when Process Water Tank 26 is full;
b. turn on Main Clarified Water Pump 28 when the water level is at the selected threshold; and
c. shut down the output pump when Process Water Tank 26 is low.

11. Stage 10: Main Clarified Water Pumo 28. Main Clarified Water Pump 28 receives input from Process Water Tank 26. Pump 28 is a greater than 40 psi maximum head pump with a typical maximum flow volume of greater than 100 gallons per minute. Pump 28 receives clarified water and pumps water through Water Polisher 30.

Figure 4:
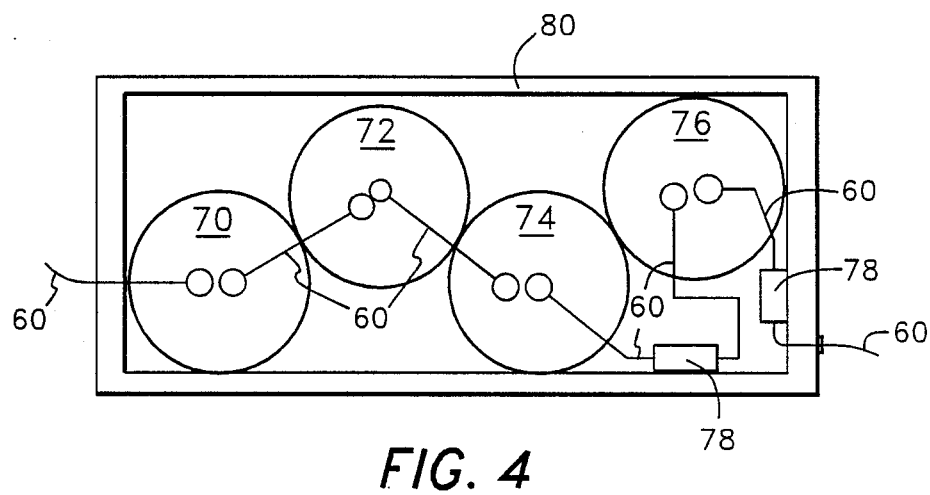
FIG. 4 shows the detail of Lint Filter 14.

Pump 28 is controlled by flotation sensors monitoring the water level in Process Water Tank 26. Pump 28 shuts off when Tank 26 water level drops to a low threshold level Pump 28 turns on at a high threshold level setting 12. Stage 11: Water Polisher 30. Please refer to FIG. 4 for detail of Water Polisher 30. The clarified water is pumped from the Process Water Tank 26 into and through the Water Polisher Unit 30. This assembly removes any chlorides, trace metals, and "nano" size residual particles. Water Polisher 30 also deionizes the water. Water polishers of this type are commercially available. The four filters in the Water Polisher are mounted in tandem and are attached to Water Polisher Skid Base 80, in the following order:
a. Charcoal Filter 70
b. Cation Resin Filter 72
c. Anion Resin Filter 74
d. Mixed Bed Resin Filter 76

The filters are connected to each other with Hose 60. One Water Quality Sensor 78 is connected between Anion Resin Filter 74 and Mixed Bed Resin Filter 76, and to the Mixed Bed Resin Filter 76 output.

13. Stage 12: Pressure Sensor 38. Pressure Sensor 38 connects to an output branch of Water Polisher 30. Pressure Sensor 38 is a 40 psi water pressure sensor and pump control. Check Valve 13 and Pressure Sensor 38 together control Auxiliary Clean Water Pump 36 functioning, in order to maintain output water pressure during cyclic interruptions.

Cyclic interruptions happen when the water level in Process Water Tank 26 drops below the threshold. Low threshold level shuts off Main Clarified Water Pump 28. When Pump 28 shuts off, output pressure to the laundry facility drops rapidly. When Pressure Sensor 38 determines that the pressure is below 40 psi the Auxiliary Clean Water Pump 36 is turned on, and then maintains pressure and flow to the laundry facility using the clean water stored in Clean Water Tanks 34.

14. Stage 13: Water Pressure Regulator 32. Water Pressure Regulator 32 connects between the Water Polisher 30 and Clean Water Tanks 34, and the input branch of Auxiliary Clean Water Pump 36. Regulator 32 protects Tanks 34 from pressures greater than 50 psi. Check Valve 13 is positioned after Regulator 32 and before Pump 36 and Tanks 34. Check Valve 13 prevents backflow during operation of Pump 36.

15. Stage 14: Clean Water Tanks 34. The cleaned purified water is pumped into Clean Water Tanks 34 via Regulator 32. Tanks 34 consist of four (4) bladder tanks and typically hold approximately 350 gallons of water each. The clean water in these tanks is held for reuse in the laundry process. The input water pressure to Tanks 34 is regulated to a maximum pressure of 50 psi to protect the bladders from damage.

Water available for reuse in the laundry comes primarily from the flow out of Water Polisher 30. The wash water demand use is not uniform and consistent, so Tanks 34 provide a buffer.

16. Stage 15: Auxiliary Clean Water Pump 36. Auxiliary Clean Water Pump 36 is a 40 psi pump. Another Check Valve 13 is connected across Pump 36 to control direction of flow. Pump 36 turns on during cyclic interruptions described previously in Stage 12 - Pressure Sensor 38.

17. Stage 16: Totalizing Water Meter 40. This water meter measures the volume of Nuclear Grade Deionized Water that is put into and supplied to the Water Reclamation Process. The initial fill of NGDI water into the Process goes through Water Meter 40 and Check Valve 13. Then the fill water goes into a pipe T at the input to Water Polisher 30 and into Clean Water Tanks 34 for storage. During operation of the laundry up to 1.5 gallons of water per dryer load will evaporate and pass through the HEPA filters to the atmosphere; therefore small amounts of replacement water will be needed periodically depending on use.

18. Stage 17: Sludge Accumulator Tank 42. Sludge Accumulator Tank 42 is typically a 20 gallon tank. Tank 42 is vented to the atmosphere. Input water to Tank 42 comes from the bypass output of Detergent Separator 22. Tank 42 is mounted to the structure of Sludge Concentrator 44 to provide gravity feed to Sludge Concentrator 44 pump input. Tank 42 has flotation sensors to prevent overflows.

19. Stage 18: Sludge Concentrator 44. The input to Sludge Concentrator 44 is from Sludge Accumulator Tank 42. Sludge Concentrator 44 is similar to Detergent Separator 22, but is scaled down to lower capacity and smaller size. The extracted water is passed to Process Water Tank 26. The bypass output feeds Evaporator Buffer Tank 46.

20. Stage 19: Evaporator Buffer Tank 46. Input to Evaporator Buffer Tank 46 comes from Sludge Concentrator 44 waste concentrate. Tank 46 is vented to the atmosphere, and has a 3 gallon capacity with a filtered vent. The output of Tank 46 is connected with gravity feed to Sludge Reduction Evaporator 48 input. Tank 46 contains a flotation Sensor for full tank to provide a shutoff signal to Sludge concentrator 44.

21. Stage 20: Sludge Reduction Evaporator 48. The Sludge Reduction Evaporator 48 is a low temperature low pressure commercial evaporator. Evaporator 48 receives waste concentrate from Evaporator Buffer Tank 46. The extracted water from the process is routed to Process Water Tank 26 for final conditioning as clean water. Evaporator 48 reduces the residual concentrate to a slurry. Evaporator 48 output is drained through a manually operated valve. The sludge residue is collected and routinely turned over to Rad Waste for disposal.

Operation of the Process

One embodiment of the invention would be in a laundry application where four industrial washing machines are generating a total of 720 gallons per hour of contaminated wash water.

Drain Tank 10 receives contaminated wash water effluent from the washing machine drain outputs through flexible 3" pipes. Tank 10 contains flotation sensors to prevent overflow. When the water level in Tank 10 reaches the turn-on threshold Main Contaminated Water Pump 16 turns on. Pump 16 could pump up to 120 gallons per minute, but typically runs at the average rate of 12 gallons per minute, evacuating the contaminated water out of Drain Tank 10 through Lint Filter 14 and into Particle Eliminator 18.

When Tank 10 detects an overfull condition, due to a downstream malfunction, (e.g., clogged filter, or pump failure) a control relay activated by the sensors turns off the power to the washers. When the power goes off, the washer outlet valves close to prevent further draining into Tank 10.

The output from Tank 10 branches to a manually activated low volume Priming Pump 12 and Check Valve 13, and then into Lint Filter 14.

Lint Filter 14 (see FIG. 2) removes lint and macro solids from the contaminated wash effluent. Lint Filter 14 is similar to a strainer. Lint Filter 14 has two separate filter assemblies. This allows Lint Filter Bag 94 on one filter assembly to be changed, while continuing process operation through the other filter assembly. This reduces down time on the process. Lint Filter Bag 94 removes macro solids from the contaminated washer drain water. Lint Filter Bags 94 are low cost, disposable inserts which are replaced manually several times each day of operation.

Priming Pump 12 is activated after routinely changing Lint Filter Bag 94. Priming Pump 12 draws water from Drain Tank 10 to fill Lint Filter 14. Check Valve 13 allows alternate pumping with Priming Pump 12. The use of Priming Pump 12 eliminates trapped air in Lint Filter 14 and line going to Main Contaminated Water Pump 16.

Main Contaminated Water Pump 16 draws input water from Drain Tank 10 through Lint Filter 14. Pump 16 turns on and off depending on the water level in Drain Tank 10. Pump 16 may be manually operated to shut off while there is a malfunction in Detergent Separator 22. Pump 16 pumps contaminated wash water into and through Particle Eliminator 18.

Particle Eliminator 18 (see FIG. 3) removes coarse, medium, and fine particles as specified in Stage 5 previously. A differential pressure meter measures the pressure loss through Particle Eliminator 18. When the meter shows total head loss of greater than 20 psi Particle Eliminator Filter Cartridges 66 are replaced.

Cartridges 66 may be changed during operation by shutting down one filtration assembly at a time. First, the input and output Manual Ball Valves 62 on one filtration assembly are closed. Canister 64 containing the coarse Cartridge 66 is opened. Spent Cartridge 66 is lifted out of Canister 64 and placed in a plastic bag for Rad Waste disposal. Then new Cartridge 66 is placed in Canister 64. Procedure is repeated for each Cartridge 66, in each filtration assembly.

Output from Particle Eliminator 18 passes through Pressure Regulator 20. Pressure Regulator 20 limits the maximum water pressure to 50 psi in the line to Contaminated Water Tanks 24 and to Detergent Separator 22. The Output from Particle Eliminator 18 flows into Detergent Separator 22 and Contaminated Water Tanks 24.

Contaminated Water Tank 24 consists of two bladder tanks which typically hold a total of about 700 gallons. Tank 24 serves as a buffer storage for feed into Detergent Separator 22. These tanks also smooth out the pressure peaks from Pump 16.

Detergent Separator 22 separates detergent elements, biological soils, and most residual contaminant particles down to sub-micron size. A 250 psi water pump feeds the multiple, ganged, filter assembly. This unit may be operated in a semiautomatic mode. In this mode the turn-on is controlled by input water pressure, and the turn-off is controlled by threshold flotation level sensors located in Sludge Accumulator Tank 42 and Process Water Tank 26.

The contaminated bypass fluid (a small percentage of the total flow, typically 5%) contains detergent, biological soils, and some radioactive particles in the submicron range. This low pressure low volume residual flows to Sludge Accumulator Tank 42 for further concentration and water reclamation.

The extracted water is clarified, containing no soap products or biological soils. This extracted water flows to Process Water Tank 26.

Process Water Tank 26 is a 375 gallon tank that is atmospherically-vented with an elevated HEPA filter. Process Water Tank 26 collects extracted water from Detergent Separator 22, Sludge Concentrator 44, and Sludge Reduction Evaporator 48. The extracted water comes into Process Water Tank 26 at very low pressure (0+ psi). Process Water Tank 26 has three flotation sensors which:

1. shut down the up-stream water sources when Process Water Tank 26 is full;
2. turn on Main Clarified Water Pump 28 when the water level is at the selected threshold; and
 a. shut down the output pump when Process Water Tank 26 is low.

Main Clarified Water Pump 28 is connected to the output of Process Water Tank 26. Pump 28 is a greater than 40 psi maximum head pump with a maximum flow volume of greater than 100 gallons per minute. Pump 28 receives clarified water and pumps water through Water Polisher 30 to the laundry facility, and to Clean Water Tanks 34 for reuse.

Pump 28 is a magnetically driven pump. The pump is controlled by flotation sensors monitoring the water level in Process Water Tank 26. Pump 28 shuts off when the tank level drops to a low threshold level. Pump 28 turns on at a high threshold level setting.

The clarified water is pumped from the Process Water Tank 26 into and through the Water Polisher Unit 30. (See FIG. 4). Water Polisher 30 removes any chlorides, trace metals, and "nano" size residual particles. Water Polisher 30 also deionizes the water. The four filters in the Water Polisher are mounted in tandem and are attached to Water Polisher Skid Base 80, as follows:
b. Charcoal Filter 70
c. Cation Resin Filter 72
d. Anion Resin Filter 74
e. Mixed Bed Resin Filter 76

The filters are connected to each other with Hose 60. Water Quality Sensors 78 are connected between Anion Resin Filter 74 and Mixed Bed Resin Filter 76 and to the Mixed Bed Resin Filter 76 output. Water Quality Sensors 78 are the final water quality test to assure that the output meets the requirements of nuclear grade deionized water.

Water Pressure Regulator 32 is connected after the output of Water Polisher 30 branch to Pressure Switch 38. The output of Regulator 38 goes through Check Valve 13 to Clean Water Tanks 34, Auxiliary Clean Water Pump Assembly 36, and output to laundry facility. The regulator protects Clean Water Tanks 34 from pressures greater than 50 psi.

The cleaned purified water is pumped into Clean Water Tanks 34 through the Pressure Regulator 32. Clean Water Tanks 34 consists of four (4) bladder tanks which hold approximately 1,400 gallons of water. The clean water in these tanks is held for reuse in the laundry cycle process. Water available for reuse in the laundry comes primarily from the output of Water Polisher 30. The laundry water demand is not uniform and consistent, and the Main Clarified Water Pump 28 is cyclic, so the Clean Water Tanks 34 provide a buffer.

Auxiliary Clean Water Pump 36 is a greater than 40 psi pump similar to Pump 28. Check Valve 13 is connected to it. Pressure Sensor 38 is a 40 psi water pressure sensor and pump control. Check Valve 13 and Pressure Sensor 38 control pump function of output water pressure during cyclic interruptions. Cyclic interruptions come from Main Clarified Water Pump 28, associated with Process Water Tank 26 water level. The input to Auxiliary Clean Water Pump 36 is from the junction of the lines from the Pressure Regulator 38 and the Clean Water Tanks 34. Pump 36 output will supply the laundry facility when Pump 28 is turned off.

Totalizing Water Meter 40 measures the volume of Nuclear Grade Deionized Water that is put into and supplied to the Water Reclamation Process. Totalizing Water Meter 40 measures the initial fill water and the replacement of water to replenish dryer evaporation. The Totalizing Water Meter 40 output feeds into a pipe T at the input to the Water Polisher 30.

Sludge Accumulator Tank 42 is a 20 gallon tank. Tank 42 is vented to the atmosphere. Input water to Tank 42 comes from the bypass output of Detergent Separator 22. Tank 42 is mounted to the structure of Sludge Concentrator 44 to provide gravity feed to Sludge Concentrator 44 pump input. Tank 42 has flotation sensors to prevent overflows and to signal low tank levels.

The input to Sludge Concentrator 44 is from Sludge Accumulator Tank 42. Sludge Concentrator 44 is similar to Detergent Separator 22, but is scaled down to lower capacity and smaller size. The bypass output feeds Evaporator Buffer Tank 46. The extracted water is passed to Process Water Tank 26.

Input comes from Sludge Concentrator 44. Evaporator Buffer Tank 46 is vented to the atmosphere, and has a 3 gallon capacity with a filtered vent. Tank 46 has an overfull flotation sensor to signal Sludge Concentrator 44 turn-off. The output of Tank 46 is connected with gravity feed to Sludge Reduction Evaporator 48 input.

The Sludge Reduction Evaporator 48 is a low temperature low pressure commercial evaporator that receives concentrate from Evaporator Buffer Tank 46. The purpose of Evaporator 48 is to reduce the residual concentrate to a slurry. Evaporator 48 output drain is Manual Valve 62. A clarified water output is fed to the Process Water Tank 26. The sludge residue is collected and turned over to Rad Waste for disposal. The typical output of sludge may be estimated at approximately 1 gallon of sludge for each 3750 pounds of wash processed.

The foregoing description details specific methods that can be employed to practice the present invention. In view of the teaching provided, one of ordinary skill in the art will well enough know how to devise alternative methods for arriving at essentially the same results and for extending this information to the solution of other technical problems. Thus, however detailed the foregoing may appear in text, it should not be construed as limiting the overall scope hereof; rather, the ambit of the present invention is to be governed only by the lawful construction of the appended claims.

What is claimed is:

1. Process comprising reclaiming improved recoveries of deionized water of up to about more than about 95% from waste water contaminated with particulate materials detergents, biological, and/or radioactive materials, by:

a. passing said waste water through one or more particulate filters to remove said particulate materials;

b. directing the effluent from said particulate filter(s) through a first reverse osmosis filter to generate purified water essentially free of detergents, biological and radioactive contaminants and bypass water contaminated with the impurities removed from said effluent; and c. removing ions from said purified-free water to generate deionized water.

2. A process according to claim 1, wherein in step b. said particulate materials are removed by passing said waste water through a series of particulate filters of different particulate filter sizes.

3. A process according to claim 2, wherein the effluent from the last of said particulate filters is substantially free of particulates greater than about 5 microns.

4. A process according to claim 1, wherein the volume of said contaminated bypass water generated in step b. is less than about 10% of the volume of said effluent.

5. A process according to claim 4, wherein the volume of said contaminated bypass water generated in step b. is about 5% of the volume of said effluent.

6. A process according to claim 4, further comprising the steps of:

d. directing said contaminated bypass water from step b. through at least one second reverse osmosis filter to generate sludge-containing water and additional purified water essentially free of detergents, biological and radioactive contaminants; and e. recycling said purified water in step c.

7. A process according to claim 6, further comprising the step of separating sludge from said sludge-containing water.

8. A process according to claim 1 or claim 6, further comprising the step of subjecting said deionized water to ultra-violet radiation to provide water suitable for medical use.

9. A process according to claim 8, further comprising the step of using the deionized water obtained by the process according to claim 8 in semiconductor material or device technology.

10. A process according to claim 1 or claim 6, performed in continuous mode.

11. A process according to claim 1 or claim 6, wherein in step c. said ions are removed by passing said purified water through cation and anion exchange resins.

12. A process according to claim 1, further comprising the step of using the deionized water generated by the steps set forth in claim 1 in processing semiconductor material.

13. The process of claim 1, further comprising the step of using the deionized water obtained by the process of claim 1 in a laundry for cleaning hospital linens.

14. Process comprising reclaiming improved recoveries of water of up to more than about 95% used in a laundry that washes protective clothing contaminated with radioactive materials, by a. washing said protective clothing in a wash solution containing detergent and deionized water to generate an effluent;

b. passing said effluent water through one or more particulate filters to remove particulate materials;

c. directing the effluent from said particulate filter(s) through a first reverse osmosis filter to generate purified water essentially free of detergents, biological and radioactive contaminants and bypass water contaminated with the impurities removed from said effluent; and d. removing ions from said purified-free water to generate deionized water.

15. A process according to claim 14, performed in continuous mode.

16. A process according to claim 15, further comprising the step of recycling said deionized water generated in step c. in washing step a.

* * * * *